No. 609,155. Patented Aug. 16, 1898.
T. R. MARSDEN.
EXHAUST OPENER LAP MACHINE.
(Application filed Sept. 28, 1897.)
(No Model.)
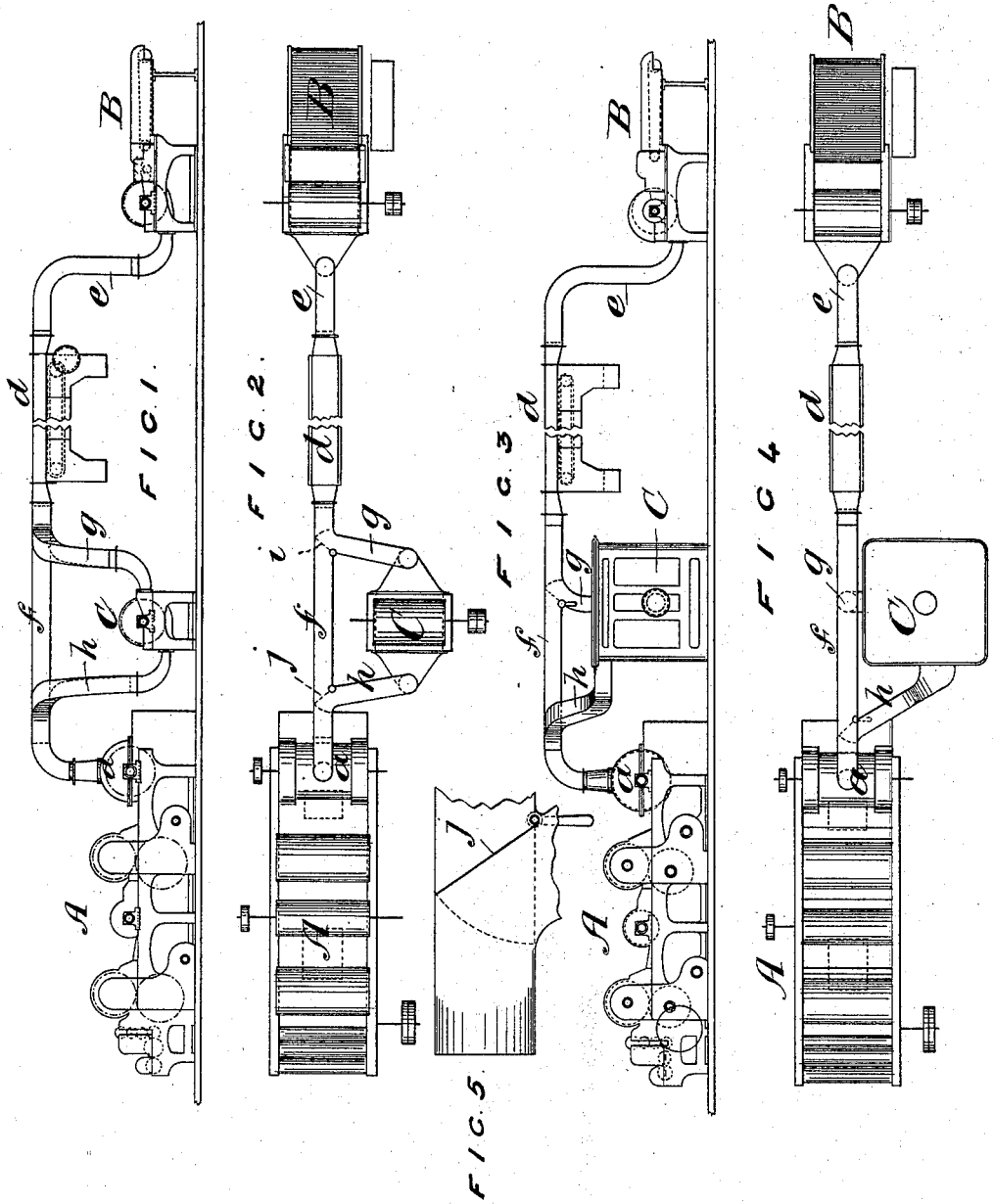
Witnesses
Inventor
Thomas Rodgerson Marsden

UNITED STATES PATENT OFFICE.

THOMAS RODGERSON MARSDEN, OF OLDHAM, ENGLAND.

EXHAUST-OPENER LAP-MACHINE.

SPECIFICATION forming part of Letters Patent No. 609,155, dated August 16, 1898.

Application filed September 28, 1897. Serial No. 653,392. (No model.) Patented in England October 31, 1892, No. 19,513.

*To all whom it may concern:*

Be it known that I, THOMAS RODGERSON MARSDEN, a subject of the Queen of Great Britain, and a resident of Oldham, Lancaster county, England, have invented certain new and useful Improvements in Exhaust-Opener Lap-Machines Used in the Preparation of Cotton, &c., of which the following is a specification.

The invention has been patented in England, No. 19,513, dated October 31, 1892.

My said invention relates to exhaust-opener lap-machines and feeders of the kind used in the preparation of cotton and other fibrous materials.

In the working of the ordinary machines the cotton passes from the lattice feeder through the dust-trunk and into the cylinder-casing of the opener, so that if different classes or grades of cotton or other fibrous materials have to be treated in the same opener changes require to be made in the speed of the cylinders and beaters in the openers and such changes take up considerable time.

In my improved apparatus, which is of a double-acting character, an auxiliary opener is applied between the feeder and the exhaust-opener, and connecting-pipes and valves are provided, so arranged as that the material—say, for example, cotton—may be passed either direct to the exhaust-opener or may be passed to the auxiliary opener and thence to the exhaust-opener.

Two arrangements for carrying my invention into effect are illustrated by the accompanying sheets of drawings.

In the combination illustrated in Figures 1 and 2 an auxiliary horizontal opener is used, while Figs. 3 and 4 show the application of a vertical opener.

Fig. 1 is a side elevation, and Fig 2 a plan, of the machinery, consisting of an exhaust-opener A, a lattice feeder B, and an ordinary or suitable horizontal or porcupine opener C. The ordinary dust-trunk is shown, curtailed in length, at $d$, such trunk being connected with the feeding-machine by means of a pipe $e$, as is usual. In place of the ordinary uninterrupted pipe which conveyed the cotton from the dust-trunk $d$ to the cylinder-casing $a$ of the exhaust-opener I apply a pipe $f$, which is provided with connecting branches $g$ and $h$, which proceed to and from the opener C. Swing-valves $i$ $j$ are applied at the junctions of these branches with the main pipes. One of these valves is shown on a larger scale in Fig. 5. The valve $j$ is so mounted as that it can be turned either across the main passage, as in Fig. 5, or across the mouth of the branch passage, leading to or from the auxiliary opener. When the two valves are turned across the main pipe, as indicated by the dotted lines in Fig. 2, the cotton passes from the feeder through the dust-trunk and is diverted through the branch pipe $g$ into the casing of the opener C, whence after being subjected to the action of such opener it returns through the branch $h$ to the pipe $f$, which conveys it to the opener A. When the valves are turned into position to close the mouths of the branch pipes, the cotton passes direct from the dust-trunk to the opener A in the ordinary manner.

The example illustrated by Figs. 3 and 4 differs from Figs. 1 and 2 only in that a vertical opener C is used for the auxiliary machine, the branch pipes being altered to suit the construction of the added opener. In this example the cotton passes downward from the pipe $f$ into the branch $g$ instead of sidewise, as in Figs. 1 and 2.

The auxiliary opener may be of any suitable construction.

Although in both examples the auxiliary opener is applied between the dust-trunk $d$ and the machine A, this is not imperative, as, if preferred for any reason, the auxiliary opener might be applied so that the cotton would be passed through the auxiliary opener before entering the dust-trunk $d$.

Ordinary parts of the machine not necessary to the sufficient illustration of my invention have been omitted from the drawings.

In the improved combination the machine A may remain suitably set to operate upon the varieties of cotton which are comparatively clean and which would be passed direct from the feeder without passing to the auxiliary opener; but when operating upon dirty or low-grade cotton the valves should be turned into position to divert the cotton to the auxiliary opener C, from which the cotton would then pass to the machine A, as hereinbefore mentioned.

I claim—

In combination with the dust-trunk $d$, the opener A, an auxiliary opener C, the pipes $g, h$, connecting the same with the dust-trunk and opener A respectively, and a pipe $f$ connecting the dust-trunk $d$ with the opener A and forming a by-pass for the auxiliary opener C, substantially as described.

In witness whereof I have hereunto set my hand in presence of two witnesses.

THOMAS RODGERSON MARSDEN.

Witnesses:
   JOSHUA ENTWISLE,
   RICHARD IBBERSON.